United States Patent
Kang et al.

(10) Patent No.: US 9,169,125 B2
(45) Date of Patent: Oct. 27, 2015

(54) METHOD FOR PRODUCING HIGH-PURITY LITHIUM CARBONATE

(75) Inventors: Dong Jun Kang, Seoul (KR); Mi Hee Yoon, Seoul (KR); Jeon Woong An, Gwangmyeong-si (KR)

(73) Assignee: KOREA RESOURCES CORPORATION, Seoul (KR)

( * ) Notice: Subject to any disclaimer, the term of this patent is extended or adjusted under 35 U.S.C. 154(b) by 12 days.

(21) Appl. No.: 13/992,818

(22) PCT Filed: Dec. 2, 2011

(86) PCT No.: PCT/KR2011/009286
§ 371 (c)(1),
(2), (4) Date: Jun. 24, 2013

(87) PCT Pub. No.: WO2012/091305
PCT Pub. Date: Jul. 5, 2012

(65) Prior Publication Data
US 2013/0272933 A1 Oct. 17, 2013

(30) Foreign Application Priority Data
Dec. 30, 2010 (KR) .................. 10-2010-0139045
Dec. 30, 2010 (KR) .................. 10-2010-0139046

(51) Int. Cl.
C01D 15/00 (2006.01)
C01D 15/08 (2006.01)

(52) U.S. Cl.
CPC .............. *C01D 15/08* (2013.01); *C01P 2006/80* (2013.01)

(58) Field of Classification Search
None
See application file for complete search history.

(56) References Cited

U.S. PATENT DOCUMENTS

| 3,000,699 A | † | 9/1961 | Gauguin |
| 4,261,960 A | † | 4/1981 | Boryta |
| 4,271,131 A | † | 6/1981 | Brown |
| 4,287,163 A | † | 9/1981 | Garrett |
| 5,219,550 A | † | 6/1993 | Brown |
| 5,993,759 A | † | 11/1999 | Wilkomirsky |
| 6,048,507 A | * | 4/2000 | Amouzegar et al. ....... 423/179.5 |
| 6,143,260 A | † | 11/2000 | Boryta |

FOREIGN PATENT DOCUMENTS

| CN | 101508450 A | | 8/2009 |
| EP | 0272013 | † | 6/1988 |
| WO | 9425145 | † | 11/1994 |
| WO | 2009/131628 A1 | | 10/2009 |
| WO | 2010006366 | † | 1/2010 |

OTHER PUBLICATIONS

Translation of CN 101508450, Aug. 2009.*
International Search Report for PCT/KR2011/009286 dated Sep. 3, 2012.

* cited by examiner
† cited by third party

*Primary Examiner* — Steven Bos
(74) *Attorney, Agent, or Firm* — Sughrue Mion, PLLC

(57) ABSTRACT

Disclosed is a method for producing high-purity lithium carbonate. The method includes: removing magnesium and boron from a brine; separating and removing the remaining magnesium and calcium; concentrating the resulting brine by spray drying to form a powder; washing the powder to concentrate lithium; and carbonating the lithium ions with sodium carbonate ($Na_2CO_3$).

3 Claims, 1 Drawing Sheet

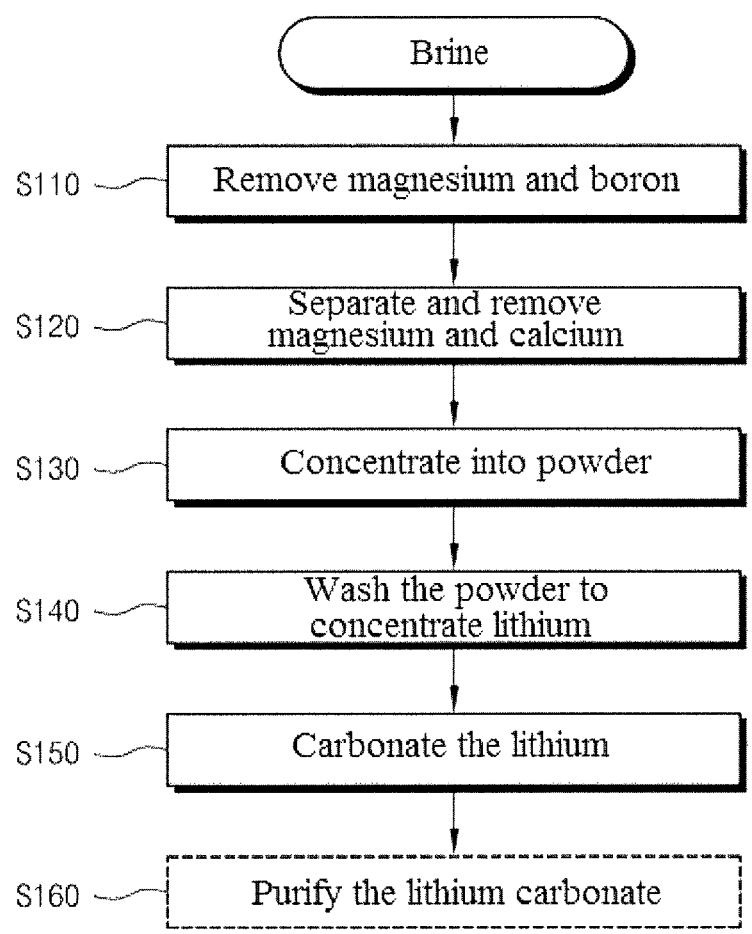

METHOD FOR PRODUCING HIGH-PURITY LITHIUM CARBONATE

TECHNICAL FIELD

The present invention relates to a method for producing high-purity lithium carbonate, and more specifically to a method for producing lithium carbonate as a lithium product in high purity from brines from the Uyuni salt flats in Bolivia wherein precipitation and concentration are used to remove impurities other than lithium from the Bolivia's Uyuni brines.

BACKGROUND ART

Lithium is a chemical element belonging to the alkali metal group and has the symbol Li and an atomic number 3. Lithium is soft and silver-white and causes corrosion.

Lithium is a strategic metal resource that can be used as a raw material for various applications, for example, secondary batteries for hybrid vehicles, electric vehicles, and mobile electronic devices, such as mobile phones and notebook PCs. Another application of lithium is a raw material for next-generation nuclear fusion power generation. Many countries control lithium as a strategically important metal resource due to its future possibility of utilization as a fuel for next-generation nuclear fusion power generation.

Lithium reserves around the world are estimated to be about 11,420,000 tons (on the basis of Li metal, Jan. 2009, USGS). However, lithium reserves are unevenly distributed in some South American countries. In this situation, individual countries around the world are fiercely competing to secure lithium supplies.

Lithium carbonate, a main supply source material for lithium, is now at a price as high as about 5,000 dollars per ton in the world market, demonstrating economic scarcity value of lithium.

South Korea is entirely dependent on imports for lithium carbonate as a key raw material for secondary batteries. Since lithium resources (brines) are not found in South Korea, the development of lithium-related technologies has focused on the recycling of lithium, and therefore, no technology for the production of lithium carbonate from brines has been established in South Korea. Moreover, in a situation where a steep rise in the price of lithium carbonate is predicted as a result of explosive demand growth in the near future, the development of lithium carbonate production technologies is more urgently needed.

On the other hand, lithium carbonate is commercially produced from brines by solar evaporation in Chile, Argentina and other countries. However, solar evaporation has problems of long evaporation time and low recovery.

Bolivia possesses the largest lithium reserves in the world but is not yet known to have its own technology for the production of lithium carbonate from the Uyuni brines. The Bolivia's Uyuni brines are very different from those of brines from Chile and Argentina in terms of lithium quality, impurity contents and evaporation amounts. Thus, development of an economical technique suitable for the production of lithium carbonate from the Uyuni brines is needed.

Therefore, there is a demand to develop a method for producing lithium carbonate from brines in an economical and efficient manner.

DISCLOSURE

Technical Problem

The present invention has been made in an effort to solve the above problems, and it is an object of the present invention to provide a method for producing high-purity lithium carbonate in a simple and highly efficient manner.

It is another object of the present invention to provide a method for producing lithium carbonate from brines within a short recovery time.

It is still another object of the present invention to provide an economical method for producing lithium present in brines in the form of lithium carbonate of high purity with improved recovery.

Technical Solution

In order to accomplish the above objects of the present invention, there is provided a method for producing high-purity lithium carbonate from a brine, the method including: removing magnesium and boron from a brine; separating and removing the remaining magnesium and calcium; concentrating the resulting brine by spray drying to form a powder; washing the powder to concentrate lithium; and carbonating the lithium ions with sodium carbonate ($Na_2CO_3$).

The magnesium and the boron are removed by adsorption and precipitation using calcium hydroxide ($Ca(OH)_2$).

The remaining magnesium and the calcium are separated and removed using sodium oxalate ($Na_2C_2O_4$).

The resulting brine is concentrated using a spray dryer to form a powder.

The method further includes, after the carbonation, washing the lithium carbonate ($Li_2CO_3$) with water to remove impurities.

Advantageous Effects

According to the method of the present invention, high-purity lithium carbonate can be produced with improved recovery within a short evaporation and concentration time when compared to commercial solar evaporation methods that are currently in use.

In addition, the method of the present invention is effective in greatly shortening the time required for brine concentration to one hour or less. In contrast, conventional methods for the recovery of lithium carbonate require a slightly long time for brine concentration.

Furthermore, the method of the present invention is related to the development of technology for the production of lithium carbonate, which is used as a base material in overall industrial fields and is entirely imported into South Korea every year. Therefore, the method of the present invention effectively provides a technological basis to acquire the right to develop lithium relating to brines, including Bolivia's Uyuni brines, in the near future.

DESCRIPTION OF DRAWINGS

FIG. 1 is a flow chart illustrating a method for producing high-purity lithium carbonate from Bolivia's brine by using a forced evaporation/concentration process and a precipitation process according to an embodiment of the present invention.

BEST MODE

The present invention will now be described in detail with reference to the accompanying drawings. It should be noted that whenever possible, the same reference numerals will be used throughout the drawings and the description to refer to the same or like parts. In describing the present invention, detailed descriptions of related known functions or configurations are omitted in order to avoid making the essential subject of the invention unclear.

As used herein, the terms "about", "substantially", etc. are intended to allow some leeway in mathematical exactness to account for tolerances that are acceptable in the trade and to prevent any unconscientious violator from unduly taking advantage of the disclosure in which exact or absolute numerical values are given so as to help understand the invention.

The present invention provides a method for producing high-purity lithium carbonate from a brine including lithium, sodium, calcium, magnesium, boron and other impurities by using concentration and precipitation processes.

FIG. 1 is a flow chart illustrating a method for producing high-purity lithium carbonate according to an embodiment of the present invention.

The method includes: removing magnesium and boron from a brine; separating and removing the remaining magnesium and calcium; concentrating the resulting brine by spray drying to form a powder; washing the powder to concentrate lithium; and carbonating the lithium with sodium carbonate ($Na_2CO_3$).

In an embodiment of the present invention, the brine may be Bolivia's Uyuni brine. One lither (L) of Bolivia's Uyuni brine contains, on average, 700 to 800 mg of lithium in an ionic form and at least 16,000 mg of magnesium in an ionic form as a major impurity. Accordingly, the production of high-purity lithium carbonate as a product from the brine requires the application of concentration and precipitation processes.

The method of the present invention involves the step of removing magnesium present in a large amount in the brine. This step is preferably carried out earlier than the other steps. Taking the solubility of magnesium chloride ($MgCl_2$) into consideration, it is anticipated that treatment of the brine without the removal of magnesium will lead to loss of lithium, for example, in the form of lithium carnalite ($LiClMgCl_2.6H_2O$).

Therefore, it is required that magnesium is firstly removed from the brine. Boron present as another impurity in the brine should also be removed. In the method of the present invention, calcium hydroxide ($Ca(OH)_2$) may be used to remove both magnesium and boron.

Calcium hydroxide ($Ca(OH)_2$) reacts with magnesium to form magnesium hydroxide ($Mg(OH)_2$) as a precipitate, and boron is adsorbed to the surface of the magnesium hydroxide ($Mg(OH)_2$). That is, the use of calcium hydroxide ($Ca(OH)_2$) enables simultaneous removal of magnesium and boron from the brine.

The principle of how boron is adsorbed to magnesium hydroxide ($Mg(OH)_2$) is as follows. Magnesium hydroxide ($Mg(OH)_2$) has a positive surface potential at a particular pH of about 12 or above, and boron exists as a negative ion. The boron is adsorbed to the magnesium hydroxide by an attractive force between the oppositely charged species.

In the present invention, sulfate ions react with calcium ions dissociated from the calcium hydroxide ($Ca(OH)_2$) to form $CaSO_4$ as a precipitate. The sulfate ions may react with lithium ions to form complex salts, such as $KLiSO_4$, as precipitates, resulting in loss of lithium. The complex salts also impede the carbonation of lithium in the subsequent step, resulting in low recovery over the entire process.

The precipitation reactions are depicted in Reactions 1 and 2. It is necessary to add a particular amount of the calcium hydroxide ($Ca(OH)_2$) taking into consideration the amount of magnesium present in the brine. The calcium hydroxide reacts with magnesium contained in the brine in a particular pH range to form magnesium hydroxide as a precipitate, which is then removed. A sufficient time of at least about 20 minutes is given for the reaction.

$$Mg^{2+}+Ca^{2+}+2(OH)^-\rightarrow Mg(OH)_2\downarrow+Ca^{2+} \quad (1)$$

By the calcium hydroxide ($Ca(OH)_2$) added to remove magnesium from the brine, sulfate ions ($SO_4^{2-}$) can be naturally removed.

Specifically, calcium ions ($Ca^{2+}$) from the calcium hydroxide react with sulfate ions ($SO_4^{2-}$) to form precipitates in the form of gypsum ($CaSO_4$). This reaction is depicted in Reaction 2.

$$Ca^{2+}+SO_4^{2-}\rightarrow CaSO_4\downarrow \quad (2)$$

The resulting brine, from which magnesium, boron and sulfate ions have been removed, is subjected to a solid-liquid separation process by which the precipitates and can be separated from a solution. The precipitates are removed and the solution is recovered.

This step may be carried out repeatedly several times. In this case, the calcium hydroxide ($Ca(OH)_2$) is added portionwise by 0.1 M at a time.

The portionwise addition of the calcium hydroxide further facilitates the adsorption and removal of boron. As a result, boron can be removed to a level of 20 ppm or below.

Next, the remaining magnesium and calcium are separated and removed.

In this step, sodium oxalate ($Na_2C_2O_4$) is preferably added.

The impurities can be removed by the addition of sodium oxalate ($Na_2C_2O_4$). Sodium oxalate ($Na_2C_2O_4$) reacts with the remaining magnesium to form magnesium oxalate ($Mg_2C_2O_4$) as a precipitate and reacts with calcium to form calcium oxalate ($Ca_2C_2O_4$) as a precipitate.

By a solid-liquid separation process, the magnesium oxalate ($Mg_2C_2O_4$) and the calcium oxalate ($Ca_2C_2O_4$) are removed, and the separated solution can be recovered.

The magnesium oxalate ($Mg_2C_2O_4$) and the calcium oxalate ($Ca_2C_2O_4$) precipitated after the solid-liquid separation can be further purified by washing several times. The purified oxalates can be reused in applications where they are needed.

Next, the separated salt solution is concentrated to form a powdery solid. That is, the resulting brine, from which the impurities have been removed, is subjected to concentration. As a non-limiting example, the brine is sprayed in a spray dryer. The spraying allows for the removal of water, thus facilitating the formation of a powder.

According to the spray drying process, the solution is injected into a spray dryer to make droplets. This process has the advantage of high heat exchange efficiency and enables rapid removal of water within a short time.

In the case of solar evaporation processes that are predominantly used at present in Chile, etc., lithium ions are mostly concentrated to a level of 60 g/L or above. In contrast, according to the present invention, lithium ions can be concentrated to a relatively low level of 5 to 30 g/L, and as a result, lithium can be produced in a purity of 99% or higher.

The powder obtained after the concentration is composed of salts including NaCl, KCl and LiCl.

The spray dryer used in the concentration step is an apparatus that sprays the solution into a hot air stream to remove water from the solution. The internal temperature of the spray dryer is maintained at 100° C. or above to create an atmosphere under which water can be evaporated. The solution is finely divided into small liquid drops (droplets) using an atomizer before being fed into the spray dryer. The increased surface area of the droplets contributes to an increase in heat transfer efficiency, leading to the evaporation of water within a short time.

As the spray dryer, there can be used, for example, one sold under the trade name Pilot spray dryer. This commercially available spray dryer includes three sections consisting of a feed section, a dryer section, and a collection section. A sample in the form of a liquid is fed into an upper spray chamber along a supply line by means of a pump. In the spray chamber, fine droplets are formed by disk nozzle atomization. The droplets enter the dryer section where they are dried. The dried particles, along with an air stream, are introduced into the collection section. In the collection section, the particles and the exhaust gas are separated by a cyclone due to the density difference therebetween. Specifically, the particles having a relatively high density are collected at the lower portion of the cyclone and are then recovered, and the exhaust gas having a relatively low density, together with a small quantity of fine particles, are released outside.

The powder thus obtained can be washed with water ($H_2O$) to concentrate lithium.

The washing may be performed several times. NaCl and KCl accounting for most of the powder are partially dissolved due to the difference in solubility, and amounts thereof exceeding the solubilities are not dissolved any more, leaving a powder form. LiCl present in a relatively small amount is continuously dissolved until the solubility limit is reached.

As a consequence, the lithium is present in the liquid. A concentrate of the lithium can be recovered by a solid-liquid separation process.

Thereafter, the lithium is subjected to carbonation. In this step, sodium carbonate ($Na_2CO_3$) is added to the concentrate containing the lithium.

The sodium carbonate reacts with the lithium to form lithium carbonate ($Li_2CO_3$), which is then recovered. The reaction is depicted in Reaction 3.

$$2(Li^{30}+Cl^-)+(2Na^++CO_3^{2-}) \rightarrow Li_2CO_3\downarrow+2(Na^++Cl^-) \quad (3)$$

The carbonation is carried out with stirring while maintaining a temperature of about 60 to about 90° C. taking into consideration the fact that the solubility of lithium carbonate ($Li_2CO_3$) has an inverse relationship with temperature. After the carbonation, the reaction mixture is subjected to solid-liquid separation using an aspirator.

Optionally, the lithium carbonate ($Li_2CO_3$) precipitate recovered by the solid-liquid separation may be washed. This step is to further purify the lithium carbonate. The washing is performed using distilled water at a temperature of 60 to 90° C. to maximally inhibit loss of the lithium carbonate. By the washing with distilled water, soluble salts, including sodium (Na) and potassium (K), adherent to the surface of the lithium carbonate crystal can be removed while minimizing loss of the lithium carbonate.

According to the method of the present invention, lithium carbonate can be recovered in a high yield with respect to the initial amount of lithium present in the brine. In addition, the lithium carbonate produced by the method has a purity of 99% or above.

MODE FOR INVENTION

Hereinafter, embodiments of the present invention will be explained in detail. In the following example, lithium carbonate was produced from the Bolivia's Uyuni brine by using precipitation and concentration processes. First, a certain amount of a sample was taken from the Bolivia's Uyuni brine. Chemical analysis revealed that the brine sample had a neutral pH of 7.0±0.2 and a density of 1.20±0.01 g/mL. The brine sample was essentially composed of Li, Ca, Mg, Na, K and B cations and Cl and $SO_4$ anions. The composition of the brine sample is shown in Table 1.

TABLE 1

| Ion | Content g/L | Content mol/L |
|---|---|---|
| Li | 0.84 | 0.12 |
| Ca | 3.33 | 0.083 |
| Mg | 16.7 | 0.687 |
| Na | 105.4 | 4.59 |
| K | 13.7 | 0.35 |
| B | 0.70 | 0.06 |
| $Cl^-$ | 203.7 | 5.58 |
| $SO_4^{2-}$ | 21.3 | 0.22 |

As can be seen from the results in Table 1, the contents of magnesium ions and sulfate ions in the brine were about 20 times and about 26 times higher than the content of lithium ions, respectively.

Taking the solubility of $MgCl_2$ into consideration, it is anticipated that evaporation and concentration of the brine without the removal of magnesium will lead to loss of lithium, for example, in the form of lithium carnalite ($LiClMgCl_2 \cdot 6H_2O$). Since the molar ratio of $SO_4$ ions to Ca ions is very high, $CaSO_4$, a portion of $Na_2SO_4$, etc. are removed as precipitates and the remaining sulfate ions form complex salts, such as $KLiSO_4$, as precipitates, resulting in loss of lithium. Accordingly, the removal of magnesium ions and sulfate ions is a prerequisite for the production of high-purity lithium carbonate ($Li_2CO_3$) by evaporation and concentration of the brine sample.

Removal of Magnesium and Boron (and Simultaneous Removal of Sulfate Ions)

In this step, calcium hydroxide ($Ca(OH)_2$) in the form of a powder was added to precipitate the magnesium in the form of $Mg(OH)_2$, which was then removed by solid-liquid separation. Specifically, calcium hydroxide ($Ca(OH)_2$) was added portionwise by 0.1 M at a time. After completion of the addition, the mixture was stirred for 20 minutes, followed by solid-liquid separation. To the recovered solution was further added calcium hydroxide ($Ca(OH)_2$), followed by solid-liquid separation. 83% or above of the magnesium (Mg) was removed. Boron adsorbed to $Mg(OH)_2$ was removed. Calcium present in the brine and calcium from the calcium hydroxide ($Ca(OH)_2$) reacted with sulfate ions to form $CaSO_4$ as a precipitate. In this step, the sulfate ions were also removed simultaneously.

The contents of the ions in the brine were measured before and after removal of the magnesium and boron. The results are shown in Table 2.

TABLE 2

| Sample | Content (mg/L) | | | | | | | |
|---|---|---|---|---|---|---|---|---|
| | Ca | Mg | Na | K | B | $Cl^-$ | $SO_4^{2-}$ | Li |
| Before Mg removal | 3,330 | 16,700 | 105,400 | 13,700 | 700 | 209,700 | 21,300 | 840 |
| After Mg removal | 2,735 | 2,735 | 87,070 | 13,520 | 20 | 196,942 | 1,060 | 827 |

The magnesium hydroxide ($Mg(OH)_2$) precipitate was not dissolved despite washing with water due to its very low solubility. Accordingly, washing the magnesium hydroxide ($Mg(OH)_2$) with distilled water or the raw brine solution enabled recovery of most of the lost lithium.

Separation and Removal of Remaining Magnesium and Calcium

In this step, sodium oxalate ($Na_2C_2O_4$) powder was added to the brine solution recovered in the above step to remove Mg and Ca as the remaining impurities before subsequent carbonation.

The sodium oxalate ($Na_2C_2O_4$) reacted with the remaining magnesium to form magnesium oxalate ($Mg_2C_2O_4$) as a precipitate and reacted with the calcium to form calcium oxalate ($Ca_2C_2O_4$) as a precipitate.

The magnesium oxalate ($Mg_2C_2O_4$) and the calcium oxalate ($Ca_2C_2O_4$) were removed by a solid-liquid separation process, and the separated solution was recovered.

The composition of the ions before and after separation and removal of the remaining calcium and magnesium is shown in Table 3.

TABLE 3

| Sample | Content (mg/L) | | | | | | | |
|---|---|---|---|---|---|---|---|---|
| | Ca | Mg | Na | K | B | $Cl^-$ | $SO_4^{2-}$ | Li |
| Before separation/removal | 12,540 | 2,735 | 87,070 | 13,520 | 20 | 196,942 | 1,060 | 827 |
| After separation/removal | 44 | 181 | 113,500 | 13,970 | 18 | 192,477 | 654 | 823 |

Concentration Into Powder

In this step, the resulting brine, from which the impurities have been removed, was concentrated to obtain a powder form. Specifically, the resulting brine was sprayed in a spray dryer to obtain a salt powder.

Concentration of lithium by washing the powder In this step, the powder formed by the concentration was washed with water ($H_2O$) to concentrate lithium.

The washing was performed several times. NaCl and KCl accounting for most of the powder were partially dissolved due to the difference in solubility, and amounts thereof exceeding the solubilities were not dissolved any more, leaving a powder form. LiCl present in a relatively small amount was continuously dissolved until the solubility limit was reached. As a consequence, the lithium was present in the liquid. A concentrate of the lithium was recovered by a solid-liquid separation process.

After the washing was repeated 3 to 10 times, the contents of the cations in the solution are shown in Table 4.

TABLE 4

| Component (mg/L) | Raw solution before washing | 3 times | 4 times | 5 times | 6 times | 7 times | 8 times | 9 times | 10 times |
|---|---|---|---|---|---|---|---|---|---|
| Mg | 181 | 425 | 646 | 840 | 1,181 | 1,402 | 1,408 | 1,512 | 1,512 |
| Ca | 44 | 111 | 118 | 136 | 170 | 170 | 170 | 170 | 170 |
| Na | 113,500 | 91,405 | 91,570 | 93,880 | 95,700 | 94,505 | 91,570 | 94,015 | 91,405 |
| K | 13,970 | 47,977 | 63,060 | 69,327 | 69,690 | 69,485 | 68,105 | 70,455 | 69,295 |
| Li | 823 | 2,436 | 3,283 | 4,472 | 5,464 | 6,766 | 8,080 | 10,150 | 12,360 |

Carbonation and Purification of Lithium Carbonate

Sodium carbonate ($Na_2CO_3$) was added to the lithium concentrate to produce lithium carbonate ($Li_2CO_3$). The carbonation was carried out with stirring for about 30 min while maintaining a temperature of about 60 to about 90° C. After the carbonation, the reaction mixture was subjected to solid-liquid separation using an aspirator.

The lithium carbonate ($Li_2CO_3$) precipitate recovered by the solid-liquid separation was washed. This step was to further purify the lithium carbonate. The washing was performed using distilled water at a temperature of 60 to 90° C. By the washing with distilled water, soluble salts, including sodium (Na) and potassium (K), adherent to the surface of the lithium carbonate crystal were removed.

As a result of the washing of the magnesium hydroxide precipitate formed in the magnesium removal step, where the largest amount of lithium was lost in the overall procedure of the method according to the embodiment of the present invention, and the washing of the impurities remaining after washing of the powder formed in the concentration step, a considerable amount of the lithium was recovered. In addition, the use of the raw brine solution during washing and the mixing of the recovered solution during feeding of the raw material increased the initial concentration of lithium, leading to a short evaporation time.

Analysis results of the lithium carbonate after carbonation are shown in Table 5.

TABLE 5

| | Components | | | | | | |
|---|---|---|---|---|---|---|---|
| | Ca | Mg | Na | K | Li | B | Sr |
| Content (wt %) | 0.04 | <0.01 | 0.15 | 0.06 | 18.7 | 0.06 | 0.04 |

| | Components | | | | | | |
|---|---|---|---|---|---|---|---|
| | Fe | Cu | Al | Ni | Zn | Cr | Pb |
| Content (mg/Kg) | <10 | <10 | <10 | <10 | <10 | <10 | <10 |

Left angle bracket ("<") indicates less than.

Although the present invention has been described herein with reference to the foregoing embodiments and accompanying drawings, the scope of the present invention is not limited to the embodiments and drawings. Therefore, it will be evident to those skilled in the art that various substitutions, modifications and changes are possible, without departing from the spirit of the invention as disclosed in the accompanying claims.

The invention claimed is:

1. A method for producing high-purity lithium carbonate from a brine wherein a content of magnesium ions and a content of sulfate ions in the brine are 20 times higher and 26 times higher than a content of lithium ions, respectively, the method comprising the steps of:

removing magnesium and boron from the brine using calcium hydroxide ($Ca(OH)_2$), wherein the calcium hydroxide reacts with the magnesium to precipitate magnesium hydroxide ($Mg(OH)_2$), and the boron is adsorbed to a surface of the magnesium hydroxide;

separating and removing remaining magnesium and calcium in the brine using sodium oxalate ($Na_2C_2O_4$), wherein the sodium oxalate reacts with the remaining magnesium to form magnesium oxalate ($Mg_2C_2O_4$) and reacts with the calcium to form calcium oxalate ($Ca_2C_2O_4$) and the magnesium oxalate and the calcium oxalate are removed from the brine by a solid-liquid separation process;

concentrating a resulting brine, which is obtained after the removing magnesium and boron step, and the separating and removing remaining magnesium and calcium step, by spray drying to form a powder;

washing the powder to concentrate lithium in liquid; and carbonating lithium ions in the liquid with sodium carbonate ($Na_2CO_3$).

2. The method according to claim 1, wherein the resulting brine is concentrated using a spray dryer to form the powder.

3. The method according to claim 1, further comprising, after the carbonating, washing lithium carbonate ($Li_2CO_3$) with water to remove impurities.

* * * * *